United States Patent [19]
Muirhead

[11] Patent Number: 5,233,913
[45] Date of Patent: Aug. 10, 1993

[54] SWASH PLATE COMPRESSOR WITH SPRING THRUST BEARING ASSEMBLY

[75] Inventor: Hugh J. Muirhead, Lockport, N.Y.

[73] Assignee: General Motors Corporation, Detroit, Mich.

[21] Appl. No.: 937,000

[22] Filed: Aug. 31, 1992

[51] Int. Cl.⁵ .............................................. F01B 3/00
[52] U.S. Cl. ...................................... 92/71; 384/620
[58] Field of Search ...................... 92/70, 71; 384/620

[56] References Cited

U.S. PATENT DOCUMENTS

| | | | |
|---|---|---|---|
| 2,374,820 | 5/1945 | Kaye . | |
| 2,433,518 | 12/1947 | Ljunggren . | |
| 3,393,022 | 7/1968 | Alven et al. . | |
| 3,469,896 | 9/1969 | Pitner | 384/620 |
| 3,934,956 | 1/1976 | Pitner | 384/620 |
| 4,268,233 | 5/1981 | Fernstrom | 418/270 |
| 4,363,608 | 12/1982 | Mulders | 417/424 |
| 4,379,425 | 4/1983 | Ishizuka | 92/71 |
| 4,511,193 | 4/1985 | Geczy | 384/611 |
| 4,701,110 | 10/1987 | Iijima | 92/71 |

Primary Examiner—Edward K. Look
Assistant Examiner—F. Daniel Lopez
Attorney, Agent, or Firm—Patrick M. Griffin

[57] ABSTRACT

A swash plate type compressor is provided having multiple cylinder bores in opposed cylinder blocks with heads, and a piston slidably mounted in each pair of opposed cylinder bores for compressing refrigerant gas. A drive or swash plate provides reciprocal movement of the piston in response to a rotary drive shaft. Thrust bearing assemblies each including a pair of Belleville spring washers are provided on opposite sides of the drive plate. A plurality of rollers held by a cage are positioned in between the washers. When compressed during assembly of the compressor by tightening the through bolts, the washers are flattened so as to extend in a plane substantially perpendicular to the axis of the shaft and provide an axial preload force to compensate for tolerance clearance and wear, and to absorb axial shock loading. A resilient O-ring is mounted on the shaft between one of the washers and the adjacent drive plate to dampen vibration.

12 Claims, 3 Drawing Sheets

EFFECT OF COMPRESSION

SWASH PLATE COMPRESSOR WITH SPRING THRUST BEARING ASSEMBLY

TECHNICAL FIELD

The present invention relates to multiple cylinder axial compressors and, more particularly, to an improved thrust bearing assembly for accommodating relative rotation having rotary and axial force components between the drive or swash plate and the compressor housing.

BACKGROUND OF THE INVENTION

In the past, automotive manufacturers have found success with a number of different types of refrigerant compressors for use in air conditioning systems. These designs include arrangements wherein the cylinders in the cylinder block of the housing are arranged in an axial array, as well as arrangements wherein the cylinders extend in a radial direction. One of the most popular axial-type compressor designs includes multiple cylinders with double-acting pistons operating in cylinder blocks at opposite ends of the compressor housing. In this type of compressor, the cylinders are equally angularly spaced about and equally radially spaced from the axis of a central drive shaft. The double-acting piston is mounted for reciprocal sliding motion in each set of the opposed cylinders. The pistons are actuated in sequence by a drive plate, sometimes referred to as a swash plate. During operation of the compressor, rotation of the drive shaft imparts a continuous wave-type reciprocating motion to the drive or swash plate. This causes the drive plate to move in a nutating path around the drive shaft, that in turn serves to impart the required linear reciprocating motion to the pistons. In effect, there is no lost motion, since each stroke of the piston results in compression of the refrigerant gas in one or the other of the opposed cylinders.

A thorough description of the operation of this type of compressor is disclosed in U.S. Pat. No. 4,351,227 to Copp, Jr. et al. (assigned to the assignee of the present invention), issued Nov. 23, 1982. As described in this prior patent, the intake of refrigerant gas into the cylinders and discharge therefrom is controlled by unidirectional reed-type valves located on the valve plates at the ends of each cylinder block. Annular intake and discharge chambers are provided in the compressor heads at each end of the compressor.

As the drive shaft rotates the drive plate so as to reciprocate the double piston back and forth in the opposed cylinders, it will be realized that substantial rotary, as well as axial force must be accommodated. To do this, it has been standard practice to provide needle bearing assemblies to support the drive shaft for rotation at the front and the rear of the compressor housing and to provide standard thrust bearing assemblies positioned on both sides between the central body of the drive plate and the stationary hub portion of the opposed cylinder blocks that form the compressor housing.

As will be realized, it is necessary to assemble the compressor so that the interacting parts are very tightly held together, especially in the axial direction. As the pistons move on their compression stroke (in both directions), substantial axial forces are generated and transferred back to the drive plate. If the proper fit has not been obtained, the compressor is noisy, and any slight looseness will eventually cause inordinate wear in the thrust bearing assemblies, as well as in the other moving elements or components. In order to best resolve this problem, engineers in the past have simply required in the specifications for the manufacturing operation to hand-pick the races of the thrust bearing assemblies to accommodate the built-in tolerance. While the usual tolerance is only plus or minus 0.010 inch, this pre-selection requirement is slow and tedious and, above all, is subject to imperfection. Oftentimes, the exact match of bearing races is not available and, in that case, the manufacturing personnel simply selects the closest available combination, even though it is not a perfect match. Also, inaccuracies in measurement of the tolerance between the hub portion of the cylinder blocks and the body of the drive plate leaves much to be desired. It is very difficult to obtain an accurate measurement since many factors are present that can throw the measurement off. For example, built into the tolerance is not only the factor of the clearance between the internal rim of the hub portions of the housing and the annular shoulder on the body of the drive plate, but also the factor of the match of the outer annular machined joint of the opposed cylinder blocks. Also, in the past, the races of the thrust bearing assemblies have been fabricated of hardened steel so that wear per se has not been a problem. However, because of the relative rigid nature of the interface, and because of the substantial rotary and axial force components that are generated during operation, the parts in many circumstances, especially in hot, humid environments, are subjected to substantial intermittent peak loading as the compression forces are transmitted through the moving components back to the drive shaft. This condition can accelerate wear, and eventually sloppiness in the thrust bearing assemblies, and even fatigue in the metal, eventually leading to premature failure.

Despite substantial design changes, especially during the past several years, an additional factor contributing to noisiness and premature wear in axial compressors must be accommodated. That is, under certain operating conditions, even the best designed compressor may suffer from a condition known as "slugging". This condition occurs when lubricating liquid enters the cylinder bore and, as the piston begins its discharge stroke, it is forced to compress this liquid, as well as the refrigerant gas. Since the liquid is substantially incompressible, the discharge stroke of the piston is inhibited. Inevitably, the compressor components are subjected to higher loads and stress since the trapped liquid slugs cause simulated shock or impact loading, especially as the piston nears the end of its stroke. This action not only adds to the possibility of premature wear and failure due to the repeated excess force and torque loading, but greatly increases the noise of the compressor during operation. Accordingly, a need clearly exists for a design improvement in multiple cylinder axial compressors to reduce the adverse effects of these operating conditions, as well as to improve and to simplify the manufacturing process.

SUMMARY OF THE INVENTION

It is accordingly a primary object of the present invention to provide a new and improved thrust bearing assembly for use in a vehicle air conditioning system that overcomes the shortcomings of the prior art.

Another object is to provide a combination thrust bearing assembly and drive shaft, especially adapted for use in a multiple cylinder air conditioning compressor that provides improved performance, and substantially reduced noise during operation.

Still another object of the present invention is to provide an arrangement for accommodating relative rotation between two elements wherein rotary and axial force components are present, thereby providing both improved efficiency of operation, reduced stress on the elements and lower noise level over that of prior art arrangements, as well as increased reliability of the elements.

It is still another object of the present invention to provide an improved thrust bearing assembly for supporting a drive shaft or the like where rotary and axial components of force are present by providing a built-in axial preload force so as to compensate for clearance due to tolerances, to minimize wear and to absorb axial shock loading.

It is another object of the present invention to provide a multiple cylinder compressor of the swash plate type, including a resilient O-ring on the drive shaft between the thrust bearing assembly and the adjacent drive plate so as to dampen vibration due to axial shock loading during compression of the gas by the pistons.

It is still another object of the present invention to provide a swash plate compressor having multiple cylinders and including an improved thrust bearing assembly having a matching pair of resilient, Belleville spring washers with a plurality of rollers retained within a cage between the washers so as to provide axial preload force to compensate for clearance and wear and to absorb axial shock loading.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved swash plate compressor is provided including a novel arrangement for accommodating built-in tolerances in the compressor assembly, thus compensating for potential clearance and wear and to absorb axial shock loading during operation. In its broadest aspects, the improvement of the present invention takes the form of a thrust bearing assembly for support of an element or component to be subjected to a driving force along a center axis having rotary and axial components. More specifically, the thrust bearing assembly includes a pair of resilient washers having matching, dished configurations in an uncompressed condition, a plurality of rollers held in a caged position between the washers; the washers having sufficient resiliency to flatten upon compression to form bearing races for the rollers, with the races extending in a plane substantially perpendicular to the axis. The spring washers provide the advantageous axial preload force in the bearing assembly. This force eliminates the need for hand selection of races of different thicknesses in order to accommodate for manufacturing tolerances. The device in which the thrust bearing assembly is mounted, whether it is an axial, multiple cylinder compressor or otherwise, is easily assembled without great concern for clearance or the possibility of inordinate wear during service. Furthermore, the ability to absorb axial shock loading and improved quietness of operation are inherent in the design.

When the thrust bearing assembly is used in a compressor or other device including a central drive shaft, such as in the axial, multiple cylinder compressors, there is provided a means to axially compress and substantially flatten the washers to form the bearing races. As the washers are flattened, the resilient memory of the washers provides the axial preload force. The preloading is preferably sufficient to position the washers substantially perpendicular to the axis of the shaft. Under shock loading, the washers can be flexed either toward greater compression, such as when the pistons provide a feedback loading during their compression stroke, or toward less compression (relaxation) when the thrust is in the opposite direction. In either case, the parts are retained in a snug relationship preventing looseness and slapping together of parts that has been a problem in some instances in the past. In an axial compressor, the washers are compressed and flattened simply by tightening the through bolts of the compressor housing.

The washers of the thrust bearing assembly are formed of spring steel. The parameters of the steel, including spring constant, hardness and dimensions, are selected to best perform the axial loading function for a particular compressor, or other device. There washers are known in the art as Belleville springs, and in the past have been employed by engineers to perform other functions; such as, snugging separate parts of an assembly together (including separate bearing races), centering of spool valves (including in a power steering gear assembly) and in other equivalent assemblies.

In accordance with another aspect of the present invention, an O-ring is utilized in a swash plate compressor or the like, in order to dampen vibration due to the axial shock loading that is experienced between the drive plate and the housing, that is, the opposed cylinder blocks. The O-ring is positioned on the drive shaft between the washer and the drive plate. As the drive shaft and plate rotate moving the dual piston to compress the gas in the cylinder bores, the resilient washers flex and the resilient O-ring is alternately compressed and relaxed. The vibration is attenuated by this action of compression and subsequent re-expansion of the O-ring.

In operation of a swash plate compressor that incorporates the concepts of the present invention, the swash or drive plate accommodates axial loading in either direction since thrust bearing assemblies are positioned on opposite sides thereof. Regardless of which direction the dual piston is compressing gas at the moment, the shock loading is accommodated. Of course, in compressors having a piston with only one operative stroke per revolution, a single thrust bearing assembly can be used to advantage. The Belleville springs act in a novel manner to both preload the thrust bearing assemblies to accommodate built-in tolerances of the compressor, thus greatly simplifying the assembly operation and reducing the cost, and to ideally absorb the inherent shock loading in a manner not previously obtainable. Simple O-rings, also easily installed between the drive plate and the adjacent washers, provide the additional important function of dampening vibration.

BRIEF DESCRIPTION OF THE DRAWINGS

The accompanying drawings incorporated in and forming a part of the specification, illustrate several aspects of the present invention and together with the description serves to explain the principles of the invention. In the drawing:

FIG. 4 is still another enlarged and broken away view of the front thrust bearing assembly of the compressor illustrating in visual form the shock absorbing and vibration dampening attributes of the assembly and adjacent O-ring, respectively.

Reference will now be made in detail to the present preferred embodiment of the invention, an example of which is illustrated in the accompanying drawings.

DETAILED DESCRIPTION OF THE PREFERRED EMBODIMENT

Figure 1:
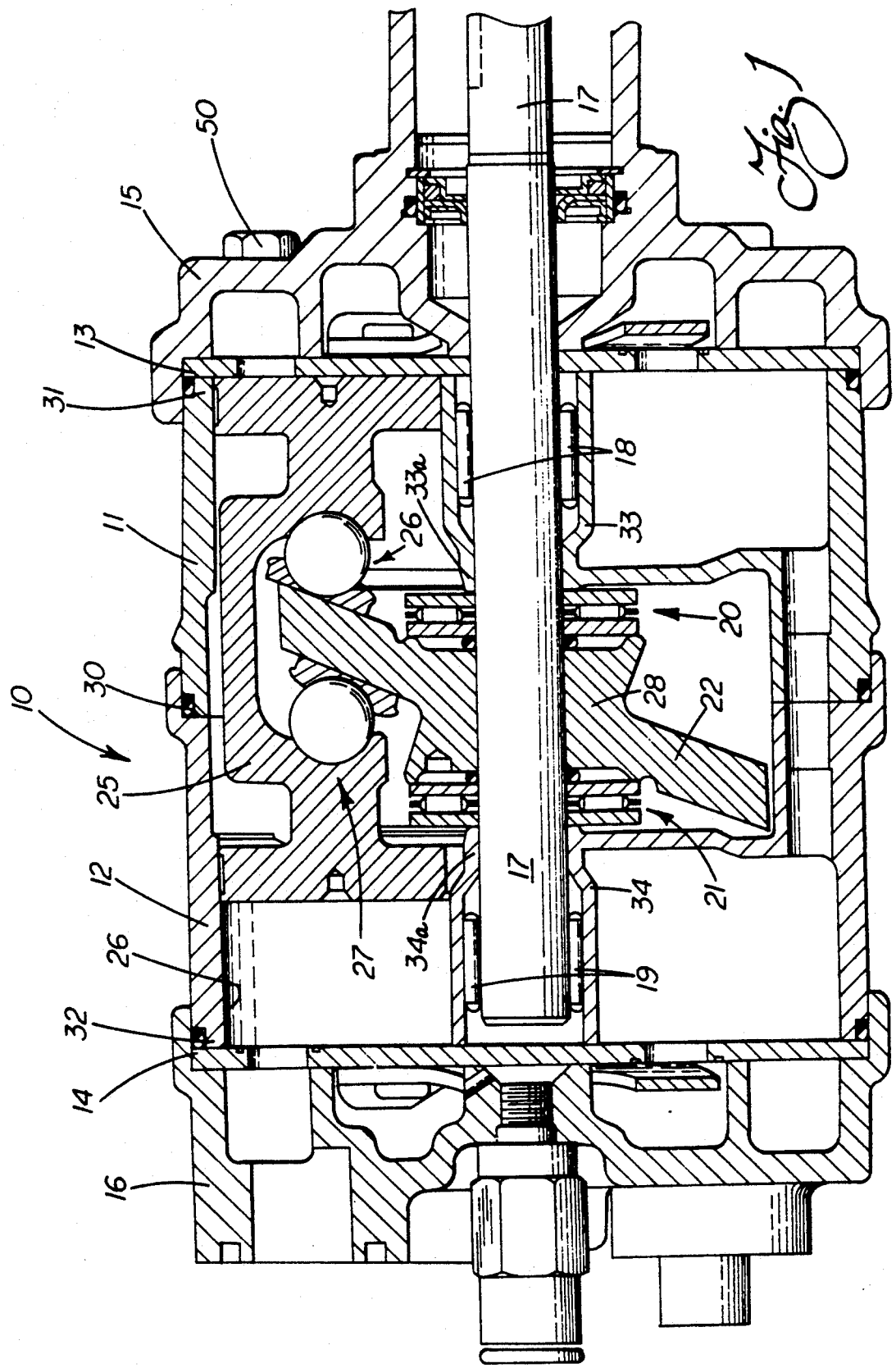
FIG. 1 is a full cross-sectional view of the compressor including a showing of the mounting of the swash or drive plate between thrust bearing assemblies incorporating the principles of the present invention.

In FIG. 1, a swash plate type compressor, generally designated by the reference numeral 10, includes a compressor housing made up of a pair of opposed cylinder blocks 11, 12. Valve discs 13, 14 and front and rear cylinder heads 15, 16 close the cylinders in the blocks 11, 12, respectively. Extending along the center axis of the compressor is a drive shaft 17 supported by front and rear needle bearing assemblies 18, 19. Also positioned on the shaft 17 are opposed front and rear thrust bearing assemblies 20, 21 supporting the drive or swash plate 22. As will be appreciated as the description progresses, the structure of the thrust bearing assemblies 20, 21 provide special advantages to this type of compressor; however, in accordance with the broadest aspects of the present invention, use of the principles of the invention is not so restricted.

The particular swash plate compressor 10 incorporates an array of dual or double-ended pistons 25 (only one shown in the drawings). Normally, three or five pistons are used in a compressor, although other numbers are possible. As is apparent, each piston 25 is operative to compress refrigerant gas in a cylinder bore 26 formed in cylinder block 12. Similarly, a cylinder bore is formed at the opposite end by the cylinder block 11, it being thus understood that three or more pairs of opposed cylinders 26 are formed in a complete compressor 10.

The swash plate 22 is effective to reciprocate the dual piston 25 back and forth between the cylinder blocks 11, 12 by following the usual nutating path. The drive plate 22/piston 25 interface includes a ball-and-socket arrangement including ball and slipper assemblies, generally designated by the reference numerals 26, 27. The drive plate 22 includes a central or core body 28 that is secured to the shaft 17 for rotation and centered in position by the thrust bearing assemblies 20, 21.

For further details of the basic operation of the swash plate compressor 10, reference can be made to the prior U.S. Pat. No. '227, referenced above. In this respect, it is important to understand that the improved thrust bearing assemblies 20, 21 are key elements or components of the present inventive concept. In the compressor operation, as viewed in FIG. 1, as the piston 25 is first moved toward the left to compress the gas in the cylinder bore 26, an equal and opposite reactive force is transmitted through the ball and slipper assembly 27 to the drive plate 22 including the central or core body 28 to the front thrust bearing assembly 20. In the reverse direction of the piston 25, the equal and opposite force is transmitted through the ball and slipper assembly 26, the drive plate 22, and the opposite thrust bearing assembly 21. In both instances, the bearing assemblies 20, 21 are operative to maintain all of these moving components snug and centered in the compressor 10 and, at the same time, absorb the shock loading caused by the compressing action, all as will be seen in more detail below.

Figure 2:
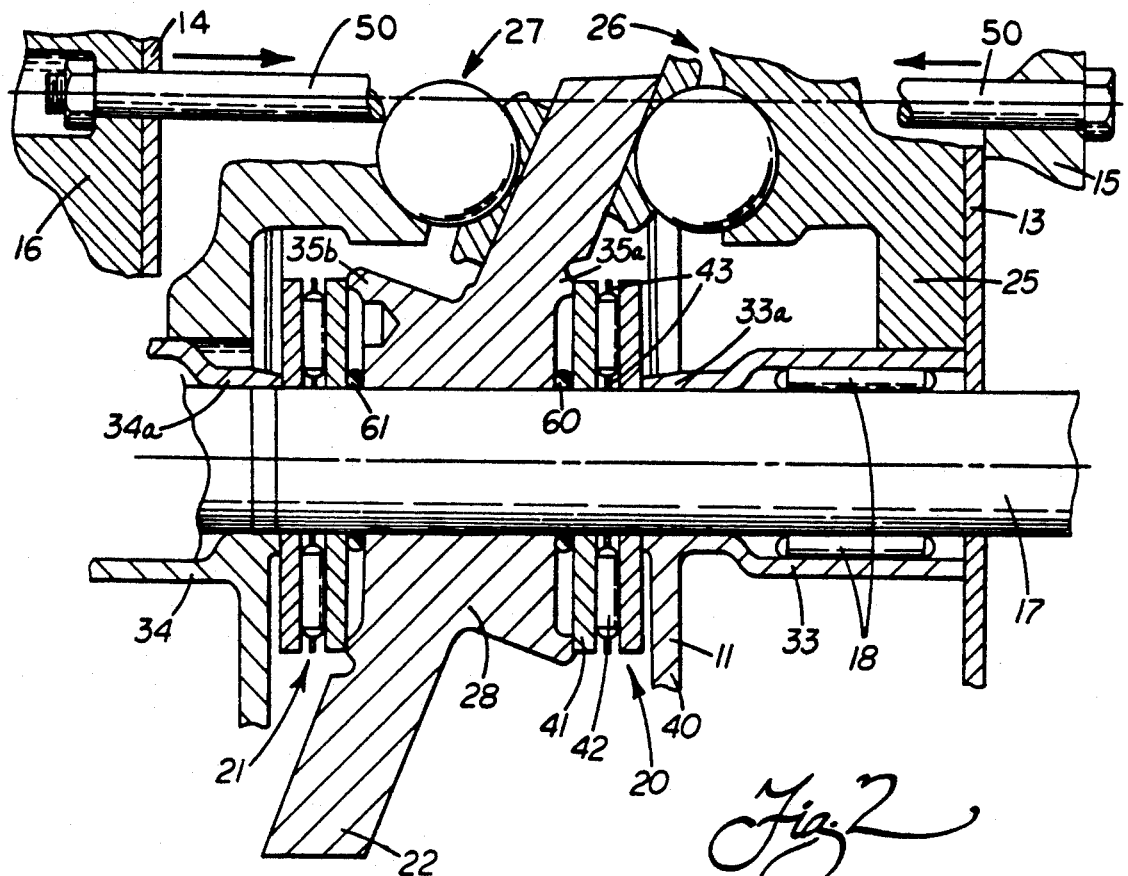
FIG. 2 is an enlarged, partially broken away view of the relationship of the drive plate, drive shaft and the front thrust bearing assembly of the present invention.
Figure 2A:
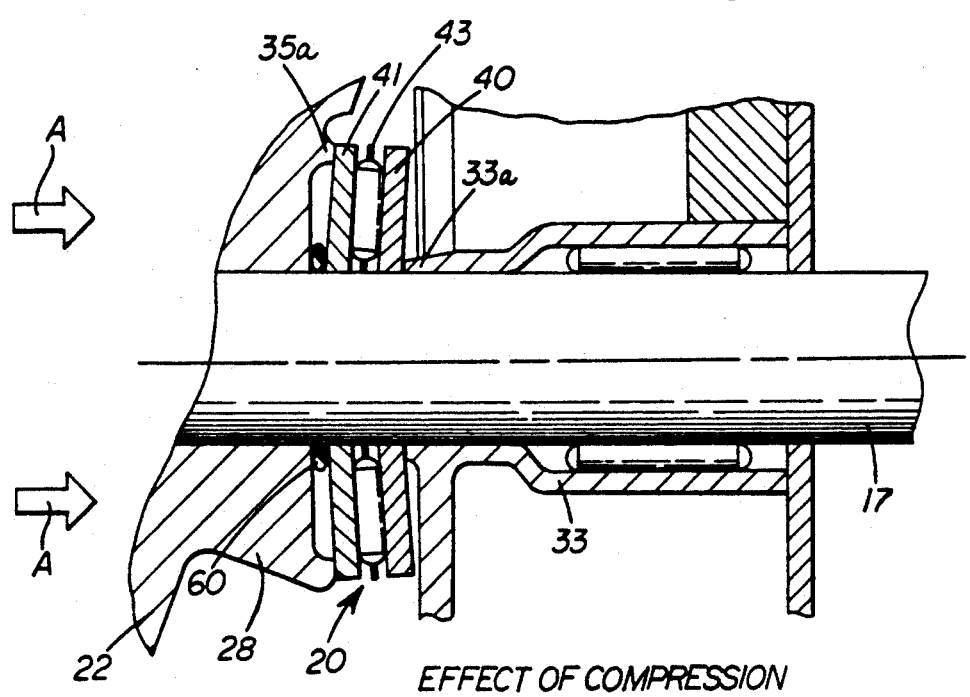

The cylinder blocks 11, 12 are connected by a machined joint 30 including an O-ring and similar joints 31, 32 are provided at the opposite ends of the front and rear cylinder blocks 11, 12. In addition, the cylinder blocks include central hub portions 33, 34 that take the form of a sleeve surrounding the drive shaft 17. As illustrated in FIGS. 1 and 2, the sleeves enclose the needle bearing assemblies 18, 19, at the front and rear of the compressor 10. The rim portions 33a, 34a of hub portions 33, 34 closely engage the drive shaft 17 and are in an abutting relationship with the inner periphery of the thrust bearing assemblies 20, 21. Similarly, an annular shoulder 35a, 35b is formed on opposite end faces of the central body 28 of the swash plate 22 to engage the outer peripheral portion of the opposite side of the thrust bearing assemblies 20, 21 (see also FIGS. 2 and 3). As will be realized, the front and rear thrust bearing assemblies 20, 21 are held in position and operate in an identical manner, as a dual piston 25 reciprocates in the opposite cylinder bores 26. Accordingly, to simplify the description, when references are made only to the front thrust bearing assembly 20, it is to be understood that the structure and operation of the rear thrust bearing assembly 21 is the same.

Figure 3:
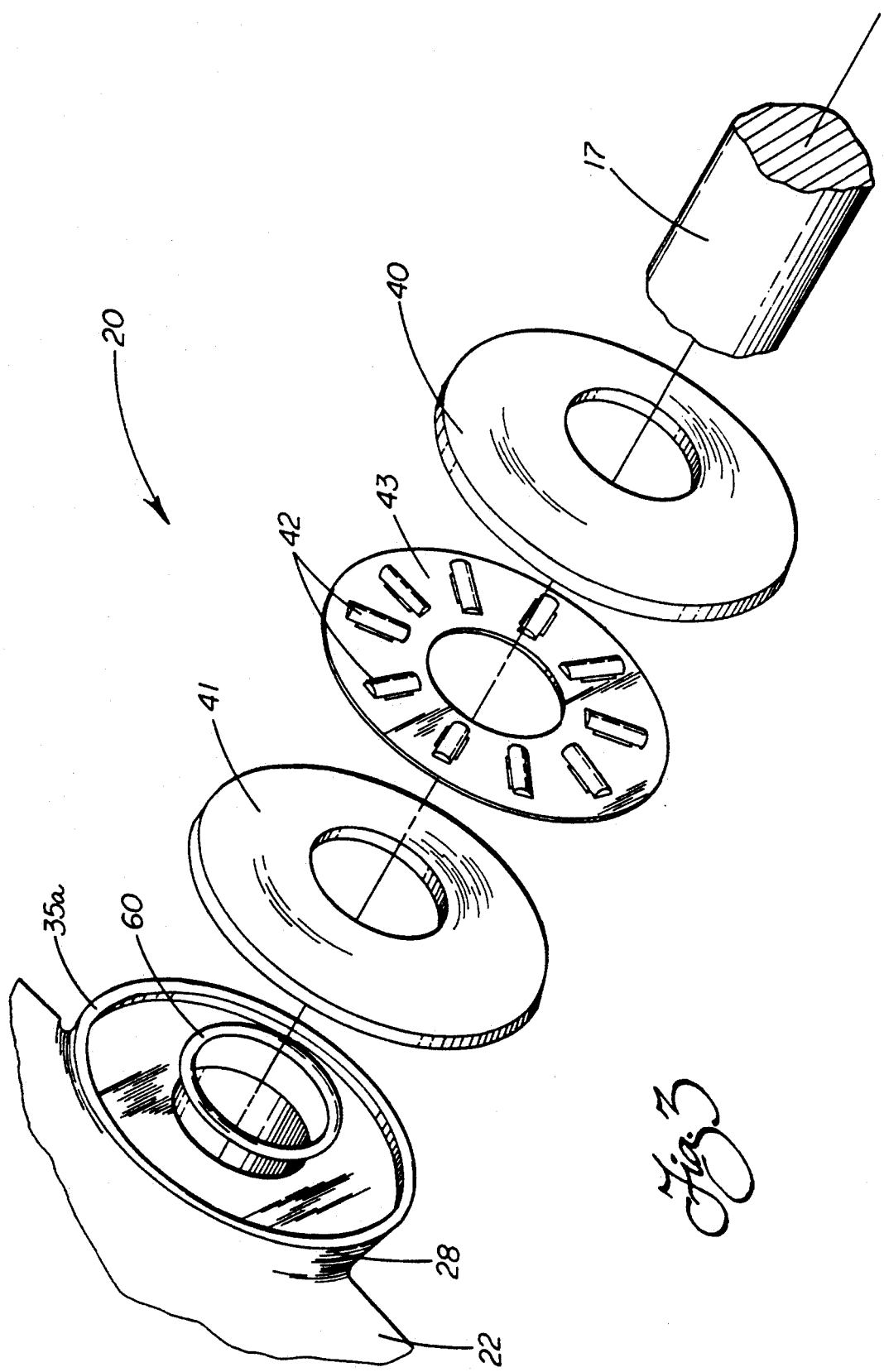
FIG. 3 is an exploded and further cutaway view of the drive plate, the front thrust bearing assembly, the drive shaft and the vibration dampening O-ring.

According to the invention, the thrust bearing assembly 20 (and likewise the thrust bearing assembly 21) includes a pair of resilient washers 40, 41 having mating dished configurations in an uncompressed condition, as best shown in FIG. 3. A plurality of rollers 42 are positioned between the washers 40, 41; a cage 43 being provided for retention of said rollers in a substantially equally radially spaced array (see FIG. 3 also). The washers 40, 41 by design have sufficient resiliency to flatten upon compression to form bearing races for the rollers 42, it being understood that the races extend in a plane substantially perpendicular to the axis of the drive shaft 17 when compressed (see FIGS. 1 and 2). These spring washers 40, 41 thus provide the advantageous axial preload force. As mentioned above, this force eliminates the need for hand selection of races with thicknesses that when added together accomplish the required snug fitting assembly of the compressor 10. In other words, selecting washers of different thicknesses is no longer needed to be relied upon, since the spring loading accomplishes the same result. With the maximum tolerance of plus or minus 0.010 inch, it has been found that the washers 40, 41 can serve successfully as races for the rollers 42. Even if a slight angling in one direction or the other is required in order to tolerate the spacing resulting from the tolerance, the bearing assemblies 20, 21 have excellent performance characteristics.

Preferably, the washers 40, 41 are formed of spring steel, with parameters including spring constant, hardness and dimensions being selected to best perform this axial loading function for a particular compressor 10, or other device. In the industry, washers with these specifications are known as Belleville springs.

In order to preload and position the washers 40, 41 in the operative position (substantially perpendicular to the center axis of the shaft 17), all that is required is for the assembled parts of the compressor 10 to be clamped together. In the preferred embodiment shown, this means takes the form of through bolts 50 that provide axial compression and flattening of the washers; only one of which is shown (broken away illustration) in FIG. 2. Any suitable number, such as five, through bolts can be used in order to provide the required preloading, compressive force that is specified.

As indicated above, not only does the preload force introduced in the washers 40, 41 provide an advantage with respect to compensating for clearance due to tolerances and/or wear between the elements, but also plays a factor in absorbing shock loading. As the piston 25 is compressing the gas in the cylinder bores 26 in either direction, the washers 40, 41 are flexed either toward greater compression, or toward less compression (relaxation). In either case, the components are retained in a snug relationship preventing looseness and slapping together, which can cause noisy operation and premature wear.

To further illustrate the effect of the compression mode, exaggerated for illustrative purposes, reference is made to FIG. 4 where the washers 40, 41 are moved to full flexure in the direction of maximum compression (note the force arrow A). As the piston 25 moves in the opposite direction, the force is relaxed, and the washers 40, 41 move in the opposite direction but still retaining sufficient preload force for retaining the components snugly together. Also, at all times the washers 40, 41 are maintained in their required relationship of being substantially perpendicular to the drive shaft 17.

In accordance with another important aspect of the present invention, resilient O-rings 60, 61 (of natural or synthetic rubber, for example) are positioned within the undercut clearance of the opposite end faces of the central body 28 of the drive plate 22 and in engagement with the adjacent washer. As the washers 40, 41 are flexed back and forth during operation of the compressor 10, there is alternate compression and relaxation of the O-ring 60. For example, as shown in FIG. 4, the O-ring 60 is compressed to its full extent. Subsequently, as the body 28 moves in the opposite direction, there is a re-expansion of the O-ring. By doing so, the O-ring 60 (and likewise the O-ring 61) is effective to attenuate the vibration of the back-and-forth movement. This feature is effective when used with the preferred embodiment dished washers 40, 41 (Belleville springs), but advantageously is also successfully used with standard, flat washers, in accordance with the broad aspects of this part of the invention.

Another important detail is best shown by reference back to FIG. 4. The hub portions 33, 34 of the cylinder block 11 are reduced to a minimum at the retaining rims 33a, 34a. Likewise, the O-rings 60, 61 are directly mounted in engagement with the shaft 17. Thus, both the rims and the O-rings are at a minimum diameter with respect to the thrust bearing assemblies 20, 21. On the other hand, the annular shoulder 35a is at a maximum diameter. With this arrangement, full leverage is obtained across the thrust bearing assemblies 20, 21 maximizing the effects of flexure in the resilient washers. To put it another way, the retaining rims 33a, 34a and the annular shoulder 35a are in engagement with the inner and outer peripheral portions of the thrust bearing assemblies 20, 21, respectively, and this takes full advantage of the built-in resiliency of the washers.

In summary, a swash plate compressor for compressing refrigerant gas is illustrated wherein improved performance, as well as substantially reduced noise during operation, is attainable by simply employing improved front and rear thrust bearing assemblies 20, 21 having resilient washers 40, 41 with matching, dished configurations. While particularly adapted for use in a swash plate type compressor having a dual piston 25, the concept can be utilized in accordance with the broad aspects of the present invention in other types of compressors. Furthermore, it is evident that the same inventive concepts pertain in other non-compressor environments; i.e. the thrust bearing assemblies 20, 21 can be used to advantage anywhere a combination thrust bearing assembly and drive shaft have similar requirements. Indeed, the broadest teachings of the invention are applicable to any thrust bearing assembly per se. The washers 40, 41 are sufficiently resilient so that when compressed and flattened, they can successfully form the bearing races for the rollers 42. The built-in preload force provided by the resilient nature of the washers, compensates for any clearances due to tolerance requirements or the like. In addition, if wear does occur, such as in severe service of the compressor 10, the preload also accommodates or compensates for that condition. Finally, axial shock loading is also absorbed by the resilient nature of the washers 40, 41, and vibration is dampened by the provision of resilient O-rings 60, 61.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A combination thrust bearing assembly and drive shaft for allowing relative rotation between two elements, one of said elements being connected to said shaft and providing rotary and axial force components comprising:
   a pair of resilient washers on said drive shaft and positioned between said elements; said washers having matching, dished configurations in an uncompressed condition;
   a plurality of rollers positioned between said washers;
   a cage for retention of said rollers in a substantially equally radially spaced array between said washers; and
   means to axially compress and substantially flatten said washers to form bearing races for said rollers extending in a plane substantially perpendicular to the axis of said shaft;

whereby an axial preload force is provided in said bearing assembly by said resilient washers to compensate for clearance and wear between said elements and to absorb axial shock loading.

2. The combination bearing assembly and drive shaft of claim 1, wherein said washers are Belleville springs.

3. The combination bearing assembly and drive shaft of claim 1, wherein there is provided an O-ring on said shaft between one of said washers and the adjacent element so as to dampen vibration due to the axial shock loading.

4. A thrust bearing assembly for support of an element to be subjected to a drive force along a center axis having rotary and axial components, comprising:
- a pair of resilient washers having matching, dished configurations in an uncompressed condition;
- a plurality of rollers positioned between said washers;
- a cage for retention of said rollers in a substantially equally radially spaced array between said washers;
- said washers being sufficiently resilient to flatten upon compression in the direction of said axis to form bearing races for said rollers extending in a plane substantially perpendicular to said axis;
- whereby an axial preload force may be provided in said bearing assembly by said resilient washers to compensate for clearance and wear and to absorb axial shock loading.

5. The bearing assembly of claim 4, wherein said washers are Belleville springs.

6. A swash plate compressor for compressing a refrigerant gas or the like, comprising:
- a cylinder block and head defining a cylinder;
- a piston slidably mounted in the cylinder;
- a drive plate for providing reciprocal movement of said piston to compress the gas;
- a drive shaft positioned along a center axis of said compressor and connected to said plate for reciprocating the piston;
- a pair of resilient washers on said drive shaft and positioned between said plate and said block; said washers having matching, dished configurations in an uncompressed condition;
- a plurality of rollers positioned between said washers;
- a cage for retention of said rollers in a substantially equally radially spaced array between said washers; and
- means to axially compress and substantially flatten said washers to form bearing races for said rollers extending in a plane substantially perpendicular to the axis of said shaft;
- whereby an axial preload force is provided in said bearing assembly by said resilient washers to compensate for clearance and wear between said plate and said block and to absorb axial shock loading during compression of the gas by the piston.

7. The swash plate compressor of claim 6, wherein said washers are Belleville springs.

8. The swash plate compressor of claim 6 wherein there is provided a resilient O-ring on said shaft between one of said washers and the adjacent drive plate so as to dampen vibration due to the axial shock loading.

9. A swash plate compressor for compressing a refrigerant gas or the like, and including a thrust bearing assembly for accommodating relative rotation including rotary and axial force components, comprising:
- a cylinder block and head defining at least one cylinder;
- a piston slidably mounted in the cylinder;
- a drive plate for providing reciprocal movement of said piston to compress the gas;
- a drive shaft positioned along a center axis of said compressor and connected to said plate for reciprocating the piston;
- a pair of resilient washers on said drive shaft and positioned between said plate and said block; said washers extending in a plane substantially perpendicular to the axis of said shaft;
- a plurality of rollers positioned between said washers;
- a cage for retention of said rollers in a substantially equally radially spaced array between said washers; and
- a resilient O-ring on said shaft between one of said washers and the adjacent drive plate so as to dampen vibration due to the axial shock loading;
- whereby said O-ring is effective to absorb axial shock loading during compression of the gas by the piston.

10. The swash plate compressor of claim 9, wherein said washers are fabricated of spring steel.

11. The swash plate compressor of claim 9, wherein said block includes an integral sleeve around said shaft and defining a retaining rim in engagement with the inner peripheral portion of the adjacent washer, and said drive plate includes an annular shoulder in engagement with the outer peripheral portion of the other washer, whereby substantially full flexure of the thrust bearing assembly is allowed.

12. The swash plate compressor of claim 11, wherein there is provided a resilient O-ring on said shaft between said other washer and the adjacent drive plate adjacent the inner peripheral portion thereof so as to dampen vibration due to the axial shock loading.

* * * * *